United States Patent [19]

Kluge

[11] 4,054,057
[45] Oct. 18, 1977

[54] TEMPERATURE SENSING PROBE AND DISPOSABLE COVER THEREFOR

[75] Inventor: Douglas J. Kluge, Minneapolis, Minn.

[73] Assignee: Diatek, Inc., San Diego, Calif.

[21] Appl. No.: 662,587

[22] Filed: Mar. 1, 1976

[51] Int. Cl.² .......................... G01K 1/08; G01K 7/16
[52] U.S. Cl. ............................. 73/343 R; 73/362 AR
[58] Field of Search ................... 73/343 R, 362 AR; 206/306

[56] References Cited

U.S. PATENT DOCUMENTS

| | | | |
|---|---|---|---|
| 3,500,280 | 3/1970 | Ensign | 206/306 X |
| 3,738,479 | 6/1973 | Sato | 73/362 AR X |
| 3,822,593 | 7/1974 | Oudewaal | 73/343 R |
| 3,832,669 | 8/1974 | Mueller et al. | 73/362 AR X |

Primary Examiner—Jerry W. Myracle
Assistant Examiner—John S. Appleman
Attorney, Agent, or Firm—Burd, Braddock & Bartz

[57] ABSTRACT

An elongated temperature sensing probe of an electronic thermometer having a movable collar and an elongated probe terminating with a probe tip including a heat sensing element. A disposable cover having an elastic cylindrical side wall mounted on a closed end member is latched to the probe to enclose the tip and surround an elongated portion of the probe. The closed end member has a thin cone-shaped thermal window which is deformed into surface engagement with the probe tip when the cover is mounted on the probe. The probe collar and open end section of the cover have coacting releasable latch structure holding the cover in assembled relation with the probe.

40 Claims; 12 Drawing Figures

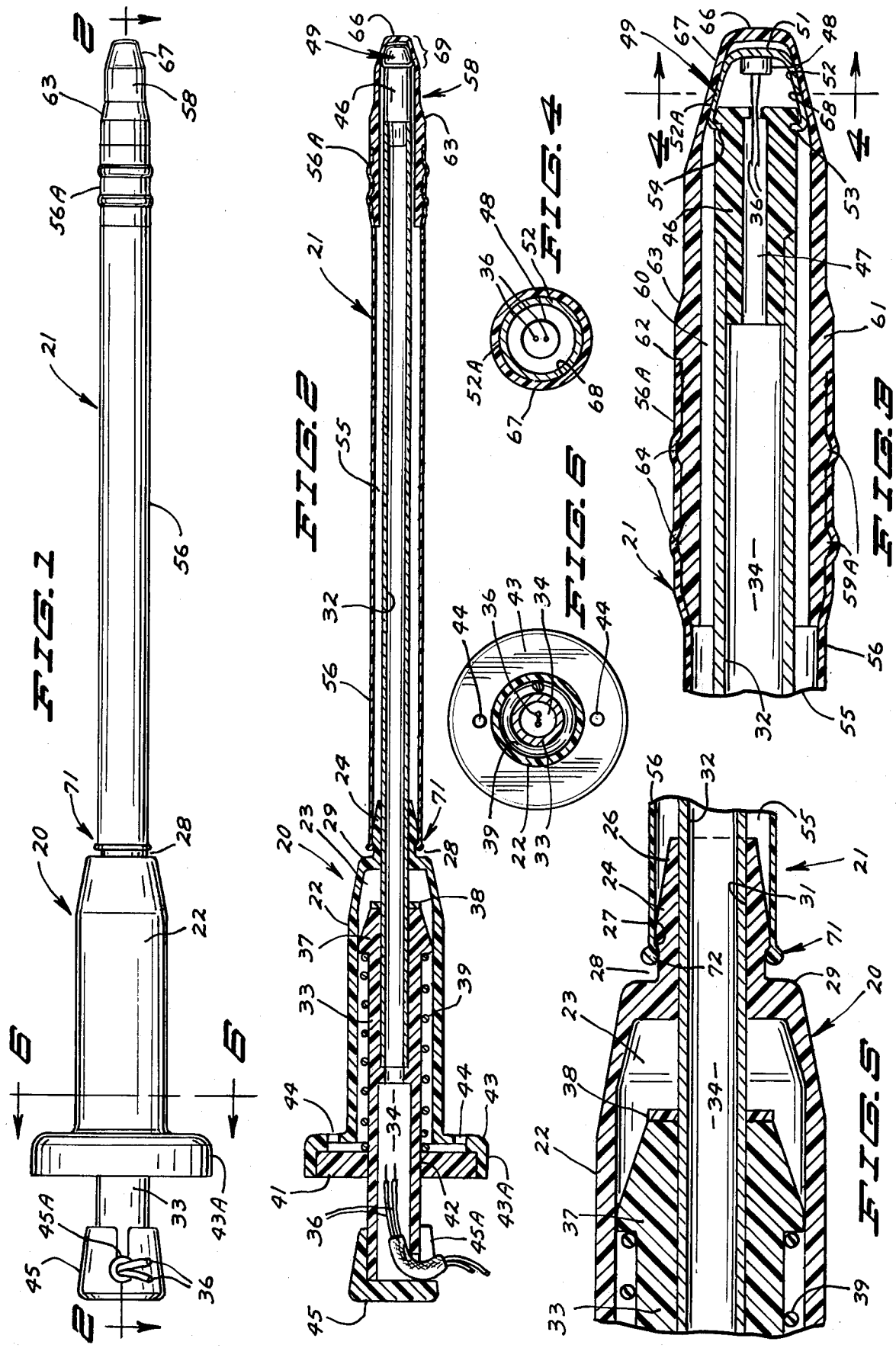

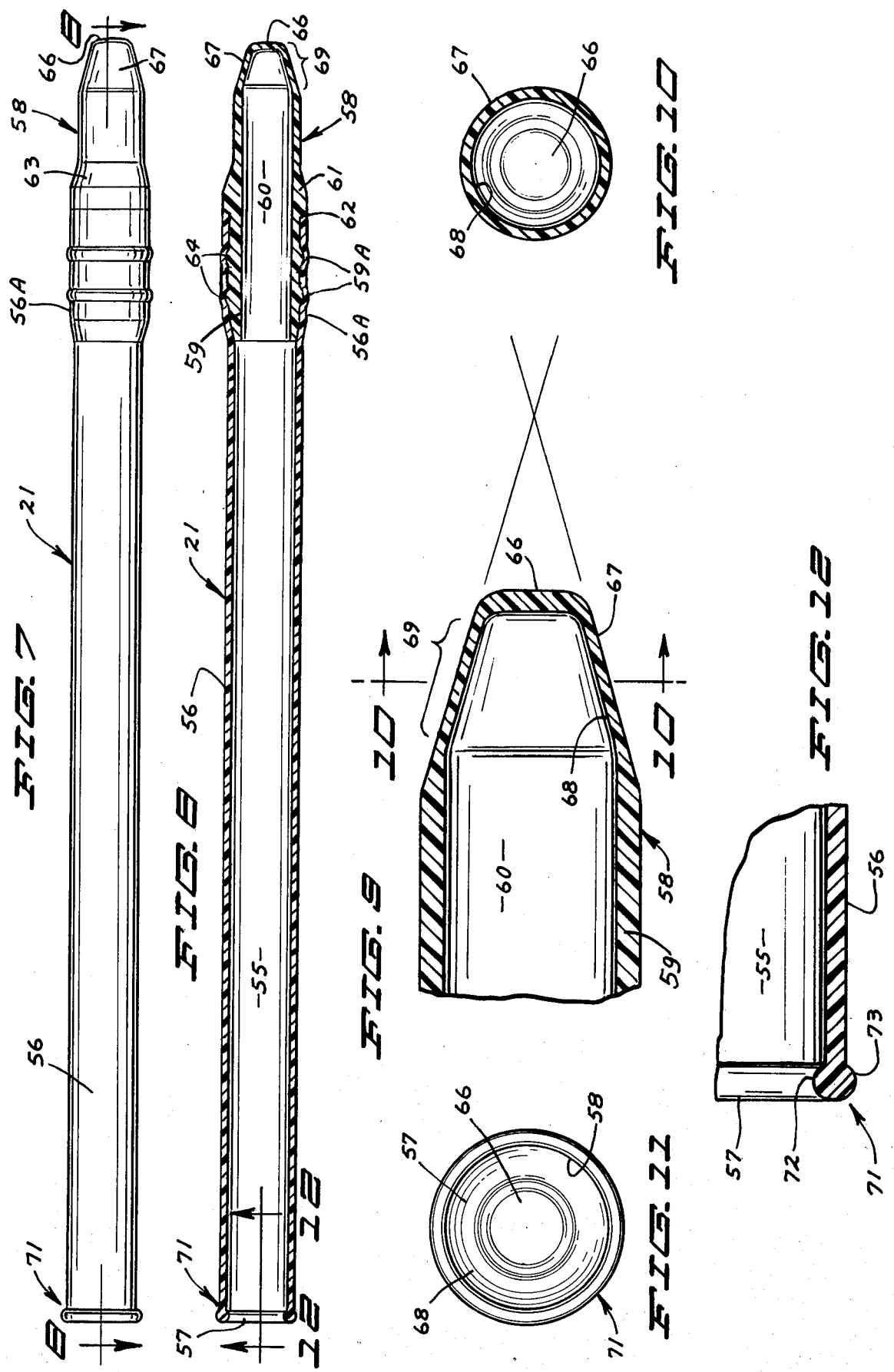

TEMPERATURE SENSING PROBE AND DISPOSABLE COVER THEREFOR

BACKGROUND OF INVENTION

Covers for glass thermometers are disclosed by Govoni in U.S. Pat. No. 2,768,736. These covers are elongated one piece tubular members having closed ends adapted to fit around the temperature sensing end of the thermometer. The wall of the cover is thin to allow rapid heating and heat transmission so that the thermometer can quickly reach its maximum temperature. Electronic clinical thermometers are equipped with elongated probes having temperature sensing elements. Disposable covers are releasably mounted on the probes so that the thermometer can be used with a number of patients by merely replacing the cover. Examples of this type of probe and cover are shown in U.S. Pat. Nos. 3,738,172 and 3,905,232. Tongret in U.S. Pat. No. 3,254,533 shows a disposable cover having an open end with an inwardly directed flange positioned over a base on the probe. The closed end of the probe has an aluminum tip for rapid transfer of heat to the temperature sensing element of the probe. Oudewaal in U.S. Pat. No. 3,822,593 discloses a disposable cover with a flexible elastic tip. A sleeve structure is used to mount the elastic tip on the end of the elongated tube. The elastic tip is adapted to be stretched over the end of the temperature sensing element of the probe. The tube has outwardly directed projections locatable in a groove in the collar to latch the cover on the probe. Another probe cover is disclosed by Naumann in U.S. Pat. No. 3,880,282. This probe has a one-piece tapered hollow body having a small closed end. The wall thickness at the closed end is thin to allow relatively rapid heat transfer through the material of the closed end.

SUMMARY OF INVENTION

The invention is directed to an electronic thermometer probe and cover for the probe. The cover is a low cost disposable able item and is effective in allowing rapid transfer to heat from a body to the temperature sensing element of the probe. The temperature sensing probe has an elongated tubular member carrying a probe tip. The probe tip has a cone shaped side wall surrounding a temperature responsive element, such as a thermistor. The side wall has a convex outside surface. A body is secured to the opposite end of the tubular member, providing a passage for electrical conductors which are connected to the thermistor. A cylindrical collar surrounds the body. A spring biases the collar over the body. The collar has a head surrounding the tubular member. The head has an outwardly directed rib or shoulder. The shoulder forms part of a coacting releasable lock or latch structure which releasably holds the cover on the probe. The cover is a disposable item having an elastic body or tube attached to a closed end member forming a cover chamber. The tubular probe member and tip are located in the cover chamber. The cover body has an open end having an annular bead surrounding the head to hold the body in assembled relation with the tubular probe member and tip. The bead forms an elastic second part of the coacting releasable latch structure that holds the cover on the probe. The closed end member has a cone-shaped thermal window section. The thermal window section has a thin flexible annular wall. The flexible wall is deformed or flexed into surface engagement with the convex shape of the side wall of the probe tip so that heat is readily transferred through said thermal window section to the probe tip and temperature responsive element carried by the probe tip.

The invention is also directed to a cover for a temperature sensing probe. The cover has an elastic tubular body of plastic having a generally cylindrical side wall surrounding a chamber. A closed end member is secured to one end of the tubular body. The other end of the body is open and has an annular bead. The end member has a thermal window section formed by a thin flexible annular wall to permit rapid heat transfer through the thermal window section. The window section is generally cone-shaped and preferably has a wall thickness in the range of 0.006 to 0.009 inch (0.15 to 0.23 mm). The inside surface of the thermal window section tapers in a forward direction toward the closed end.

An object of the invention is to provide a low cost disposable cover or sheath for a temperature sensing probe that is safe, sturdy and reliable in use, can be sterilized, and is easily assembled and released from the probe. Another object of the invention is to provide a probe cover with an annular window section that can be located in deformed surface engagement with a probe tip having a temperature sensing element. A further object of the invention is to provide a probe cover and probe combination with releasable latch structure that will hold the cover in operative relationship with the probe tip and can be readily released from the probe. Another object of the invention is to provide a coacting latch structure between a probe and probe cover that requires an external positive force to separate the cover from the probe. An additional object of the invention is to provide a cover for a temperature sensing probe that is ecologically conservative as it is made with a minimum of material by automatic machinery. Yet another object of the invention is to provide a cover for a temperature sensing probe that has a flexible body that can be deformed by the lips, gums or teeth of a patient. A still further object of the invention is to provide a cover for a temperature sensing probe that has self-ejecting or propelling behavior from the probe when released from the head. These and additional objects, advantages and features of the temperature sensing probe and cover for the probe are set forth in the following description and drawings.

IN THE DRAWINGS

FIG. 1 is a side elevational view of a temperature sensing probe and disposable cover therefor of the invention;

FIG. 2 is a sectional view taken along line 2—2 of FIG. 1;

FIG. 3 is an enlarged sectional view of the temperature sensing end of the probe and cover of FIG. 1;

FIG. 4 is a sectional view taken along line 4—4 of FIG. 3;

FIG. 5 is an enlarged sectional view of the coacting releasable lock structure of the probe and cover;

FIG. 6 is a sectional view taken along line 6—6 of FIG. 1;

FIG. 7 is a side elevational view of the disposable cover of the invention;

FIG. 8 is a sectional view taken along line 8—8 of FIG. 7;

FIG. 9 is an enlarged sectional view of the closed end of FIG. 7;

FIG. 10 is a sectional view taken along line 10—10 of FIG. 9;

FIG. 11 is an enlarged end view of the open end of FIG. 7; and

FIG. 12 is an enlarged sectional view taken along line 12—12 of FIG. 8.

DESCRIPTION OF PREFERRED EMBODIMENT

Referring to the drawing, there is shown in FIGS. 1 and 2 a temperature sensing probe assembly indicated generally at 20 equipped with a disposable cover or sheath 21. The probe 20 is part of an electronic thermometer used orally or rectally by nurses, paramedics, physicians and veterinarians to read the temperatures of humans and animals. An example of an electronic thermometer having a digital readout is disclosed by Kauffeld and Holst in U.S. Pat. No. 3,872,726.

Probe 20 has a cylindrical collar or sleeve 22 surrounding an elongated cylindrical chamber 23. A head 24 projects forwardly from the collar 22. As shown in FIG. 5, the forward end of head 24 has a cone-shaped converging nose 26 providing a tapered guide surface for the open end of cover 21. An outwardly directed annular shoulder or rib 27 is located rearwardly of the nose 26 and forms an annular recess or groove 28 with a shoulder 29 on the forward end of collar 22. Head 24 has a longitudinal axial passage 31 slidably accommodating a tubular member 32. Member 32 is made of rigid material, as stainless steel tubing.

An elongated cylindrical body 33 is located in chamber 23. Body 33 has a longitudinal passage 34 with a portion accommodating one end of tube 32 to connect the tube to body 33. Electrical conductors 36, as wires, are located in passage 34 and the passage of tube 32 to electrically couple a temperature or heat sensing element 48, as a thermistor, to the electronic circuit of the thermometer. The forward part of body 33 has an enlarged outwardly directed annular flange 37 and a front end carrying an annular washer or cushioning member 38. Flange 37 is engaged by a coil spring 39 concentrically positioned about body 33. The spring 39 engages an annular cap 41. Cap 41 has a center hole 42 which permits body 33 to project through cap 41. Collar 22 has an outwardly directed annular ring 43 having an axial flange 43A surrounding the cap 41. The inside of flange 43A has an inclined or tapered annular surface which cooperates with the other peripheral edge of cap 41 to hold the cap 41 in firm assembled engagement with ring 43. Preferably, the collar 22 and ring 43 are made of a one-piece plastic material which is rigid but which has sufficient elasticity to permit flange 43A to stretch so that the cap 41 can be removed from ring 43. Ring 43 has a pair of holes 44, shown in FIGS. 2 and 6, which are used to accommodate a tool having fingers which apply a longitudinal force to cap 41 to remove the cap from ring 43.

The outer end of body 33 is closed with a cup-shaped cap 45. Cap 45 has a side opening 45A providing an outlet for the conductors 36. The cap 45 is also a hand engaging member used in conjunction with fingers in contact with ring 43 to remove the cover 21 from the probe 20.

Referring to FIGS. 2 and 3, tube 32 extends the length of cover 21 and is connected at its forward or right end to a coupling or probe insulator 46 of electrically and thermally insulative material, as a plastic such as polycarbonate. Coupling 46 has a longitudinal passage 47 for accommodating portions of conductors 36 that are connected to the temperature sensing element 48. A probe tip indicated generally at 49 is mounted on the forward end of coupling 46. Tip 49 has a generally flat, circular forward or closed end 51 having an inside surface in engagement with the temperature sensing element 48. Element 48 is secured to end 51 with a suitable material, such as solder or the like. End 51 is integral with a cone-shaped wall 52. Side wall 52 terminates with an inwardly directed flange 53 which fits into an annular groove 54 in coupling 46 to secure tip 49 to coupling 46. The side wall 52 has an outside annular surface or face 52A having an outwardly curved or convex shape. For example, the outer surface 52A of wall 52 has a 0.5 inch radius (12.7mm) normal to the longitudinal axis of the cone. Tip 49 is made of heat transmitting material, such as silver or a like metal.

Referring to FIGS. 7-11, the probe cover or sheath 21 has an elongated hollow body or tube 56. Body 56 is a one-piece plastic tubular member having a thin cylindrical side wall and can be made from polypropylene, polyethylene and like plastics. Body 56 is a flexible and elastic plastic and has a thin cylindrical wall that can be longitudinally and circumferentially stretched. The plastic is smooth and compatible with body tissue and resistant to body fluids. The side wall of body 56 has a straight cylindrical shape and uniform diameter throughout its length. This side wall can be easily deformed by the mouth of a patient thereby minimizing movement of the probe cover and probe in the patient's mouth.

Body 56 has an open end 57 and an elongated linear passage or chamber 55. A tip or closed end member 58 is mounted on the forward end of body 56. Member 58 has a cylindrical open end section or tubular section 59 surrounded by the forward end 56A of body 56 and a longitudinal chamber 60. Section 59 has a wall thickness of about 0.025 to 0.035 inch or 0.6 to 0.9 mm. A pair of annular ribs 59A project outwardly from the outside surface of section 59. End section 59 joins a middle section 61 having an annular shoulder 62 and a forward tapered surface 63. Shoulder 62 provides a rectal insertion indicia or line indicating the proper rectal penetration position of the cover. The forward end of body 56 abuts against shoulder 62. As shown in FIGS. 3 and 8, the outside diameter of section 59 is larger than the inside diameter of body 56 so that end 56A is enlarged or stretched over section 59. The end 56A is in tight annular surface engagement with the outside surface of section 59 and its rib 59A. A heat seal or fuse 64 permanently bonds and seals the end 56A to section 59 so end member 58 cannot be removed from body 56 and prevents body fluids from flowing into cover chamber 55.

Referring to FIGS. 8 and 9, end member 58 has a generally flat transverse or blunt closed end or front wall 66 integral with an annular cone-shaped wall section 67. Wall 66 has a diameter of about half the diameter of the side wall 56 of cover 21. Section 67 has an inside cone-shaped surface 68. Surface 68 is straight or linear and converges in a forward direction toward end 66. Preferably, surface 68 is inclined at an angle of 16° relative to the longitudinal axis of the chamber 60. This angle can range between 12° and 20°. The wall section 67 is relatively thin as compared to the thickness of section 59. Wall section 67 is elastic and flexible so that it can be stretched, distended or expanded over the probe tip 49. The material of section 67 has characteristics such that it does not deform or stretch beyond its elastic limit when the cover is in assembled relation with the probe. The elastic contracting force of the plastic of section 67 holds the inside surface 68 in firm and full surface engagement with the side wall 52A of the probe tip 49. Preferably, wall section 67 has a thickness of between 0.006 and 0.009 inch, or 0.15 and 0.23 mm. Section 67 has a wall thickness of about one-fourth the thickness of the side wall 59 of end member 58. The cone-shaped wall section 67 forms an annular thermal window which is relatively thin to permit controlled and efficient heat transfer between the outside environment and the inside of the chamber 60. The thermal window is indicated at 69 in FIGS. 2, 8 and 9.

As shown in FIGS. 7, 8, 11 and 12, the end of body 56 surrounding the opening leading to the body passage 55 has an annular bead indicated generally at 71. The bead 71 is continuous and has an inwardly directed rib or flange 72 and an outwardly directed rib or flange 73. The bead 71 functions to reinforce the end of body 56 and acts as an elastic ring or garter that holds the cover in assembled relation with the probe. Bead 71 is part of the coacting latch structure that holds the cover 21 on probe 20.

In use, probe 20 is coupled via the electric line or cord 36 to the electronic thermometer and is a permanent and reusable part of the thermometer. Cover 21 is a disposable item that has a single use. In other words, after the temperature of a patient is monitored by the electronic thermometer, the cover 21 is ejected from the probe 20 and a new cover is mounted on the probe for use with another patient.

A new cover is placed on the probe tube 32 by inserting the tube 32 into the cover passage 55 through the open end 57. The probe is moved into the cover 20 until the probe tip 49 is in full surface engagement with the inside surface 68 of the annular cone-shaped wall 67 and the annular bead 71 is located in the annular groove 28 behind shoulder 27. The collar 22 is moved toward the tip 49 to force the annular bead 71 along nose 26 to the groove 28. The body 56 has sufficient strength so that the bead 71 rides up on the nose 26 and circumferentially expands until the bead 71 is located in the groove 28. As soon as the bead 71 passes over the shoulder 27, it contracts so that the inner annular rib 72 is in annular engagement with the shoulder 27. When the cover 21 is fully mounted on the probe 20, the cone-shaped outer wall 52A of the probe tip 49 is in full and firm surface engagement with the inside cone-shaped surface 68 of the wall section 67. Wall section 67 is slightly deformed outwardly into a convex shape as the cover 21 is pulled over the probe tip 49 to deform the relatively thin wall section 67. This insures a uniform annular surface engagement over the length of the surface 52A of the probe tip 49 so that there is a controlled and efficient transfer of heat from the outside environment to the probe tip 49. Spring 39 acting on cap 41 and body 33 yieldably pulls cover 21 into engagement with the tip 49 to maintain the full, firm surface engagement between the surfaces 52A and 68. The elastic side wall 56 of cover 21 also functions as a biasing means or spring to bias the flexible wall 67 of the thermal window section 69 into full surface engagement with the convex shaped side wall 52A of tip 49.

Cover 21 is released and removed from the probe by applying a compressive force to spring 39. This is accomplished by gripping ring 43 with the first two fingers. The base of the thumb is placed against the end of cap 45. A squeezing force will compress spring 39 and provide relative movement between collar 22 and tube 32. Thus, the head 24 and probe tip 49 are moved in opposite longitudinal directions. The relative movement between head 24 and probe tip 49 will elongate or stretch the elastic body 56 until sufficient force is developed to expand the annular bead 71 so that it will slip over the shoulder 27. Once the annular bead 71 is free of shoulder 27, the body 56 will return to its non-stretched or original position. This provides the cover 21 with a reversing thrust or force so that it will propel itself from the probe tube 32. The operator can direct the cover 21 to an appropriate disposal container without touching or handling the used cover.

While there has been shown and described a preferred embodiment of the temperature sensing probe and disposable cover for the probe, it is understood that changes in size, shape, structure and materials can be made by those skilled in the art without departing from the invention.

The embodiments of the invention in which an exclusive property or privilege is claimed are defined as follows:

1. A temperature sensing probe and cover therefor comprising: a temperature sensing probe including an elongated tubular member having a first end and a second end, a tip secured to the first end of the tubular member, said tip having a forwardly converging annular side wall, said side wall having an outward convex shape, a temperature responsive element secured to the tip, a body secured to the second end of the tubular member, a cylindrical collar having a chamber accommodating the body, a head secured to the collar surrounding the tubular member between the body and tip, and means surrounding the body and engageable with the collar to bias the collar away from the tip, said head having an annular groove and an annular shoulder facing the groove; a cover for enclosing part of the tubular member and the tip, said cover having a body, said body having a generally cylindrical elastic side wall forming a cover chamber accommodating part of the tubular member, an end member of rigid material attached to the body for accommodating the tip, said side wall having an open end section surrounding the head, said open end section having an annular bead located in the groove and engageable with the shoulder to hold the cover in assembled relation with the tubular member and tip, said end member having a forwardly converging annular thermal window section, said thermal window section having a flexible annular wall being deformed into surface engagement with the outward convex shaped side wall of the tip whereby heat from the environment adjacent the thermal window section is transferred through said thermal window section to the tip and temperature responsive element secured therto, said means surrounding the body and engageable with the collar to bias the collar away from the tip being operable to bias the flexible wall of the thermal window section into surface engagement with the convex shape of the side wall of the tip.

2. The structure of claim 1 wherein: said thermal window section has a wall thickness in the range of 0.006 to 0.009 inch.

3. The structure of claim 1 wherein: said thermal window section has an inside annular surface tapering in a forward direction at an angle of between 12° and 20° relative to the longitudinal axis of the cover.

4. The structure of claim 1 wherin: said thermal window section has a length of about 0.10 inch and a wall thicknes of 0.006 to 0.009 inch.

5. The structure of claim 1 wherein: said cover body is an elongated tube of flexible material.

6. The structure of claim 1 wherein: said bead has an inwardly directed annular flange.

7. The structure of claim 1 wherein: said bead has an inwardly directed annular flange and an outwardly directed annular flange.

8. The structure of claim 1 wherein: the bead is elastic whereby the bead can be forced over the shoulder and contract into the groove.

9. The structure of claim 1 wherein: the end member has a tubular section, said cover body being positioned about said tubular section and secured thereto.

10. The structure of claim 1 wherein: the end member has an outside means providing an indication of a rectal insertion position.

11. The structure of claim 1 wherein: said body of the probe has a forward end located in the chamber of the collar and resilient means located adjacent said forward end to separate the forward end from the collar when the body of the probe fills the chamber of the collar.

12. A temperature sensing probe and cover therefor comprising: a temperature sensing probe having an elongated member, a tip on one end of the elongated member, said tip having a side wall, a temperature responsive element secured to the tip, and means having a head surrounding the elongated member; a cover having an elastic side wall forming a cover chamber accommodating part of the elongated member, said side wall having an open end section surrounding the head, said open end section having means cooperating with the head to hold the cover in assembled relation with the elongated member and tip, said cover further having a closed end member of rigid material secured to the end of the side wall opposite the open end section; said end member having a flexible annular wall forming an annular thermal window section surrounding a chamber accommodating the tip of the probe, said annular wall being deformed into surface engagement with the side wall of the tip whereby heat from the environment adjacent the thermal window section is transferred through said thermal window section to the tip and temperature responsive element secured thereto.

13. The structure of claim 12 wherein: said side wall of the tip has a tapered convex outside surface, and said flexible wall of the thermal window section has a tapered non-convex inside surface which is complementary to the outside surface and of a size whereby the flexible wall stretches over the outside surface of the tip.

14. The structure of claim 13, wherein: said outside surface and inside surface each has a general rounded cone shape.

15. The structure of claim 12 wherein: said thermal window section has a wall thickness substantially less than the thickness of the remainder of the wall of the end member.

16. The structure of claim 12 wherein: said thermal window section has a wall thickness in the range of 0.006 to 0.009 inch.

17. The structure of claim 12 wherein: said thermal window section has an inside annular surface tapering in a forward direction at an angle of between 12° and 20° relative to the longitudinal axis of the body.

18. The structure of claim 12 wherein: said closed end member has a front wall having a diameter of about half the diameter of the side wall of the cover.

19. The structure of claim 12 wherein: the means cooperating with the head to hold the cover in assembled relation with the elongated member and the tip includes an annular bead on the side wall.

20. The structure of claim 19 wherein: said bead has an inwardly directed annular flange.

21. The structure of claim 19 wherein: said bead has an inwardly directed annular flange and an outwardly directed annular flange.

22. The structure of claim 12 wherein: the closed end member has a tubular section, said side wall of the cover being positioned about said tubular section and secured thereto.

23. The structure of claim 12 wherein: the closed end member has an outside means providing an indication of a rectal insertion position.

24. A temperature sensing probe and cover therefor comprising: a temperature sensing probe including an elongated member having a first end and a second end, a tip secured to the first end of the member, said tip having a forwardly converging annular side wall, said annular side wall having an outward convex shape, temperature responsive means secured to the tip, and holding means secured to the second end of the member; a cover for enclosing part of the member and the tip, said cover having a body forming a cover chamber accommodating part of the member, an end member of rigid material attached to the body for accommodating the tip, said end member having a forwardly converging annular thermal window section, said thermal window section having a flexible annular wall located in surface engagement with the outward convex shaped side wall of the tip whereby heat from the environment adjacent the thermal window section is transferred through said thermal window section to the tip and temperature responsive element secured thereto, said body having means cooperating with the holding means to hold the cover in assembled relation with the elongated member and tip to hold the flexible wall of the thermal window section into surface engagement with the convex shape of the side wall of the tip.

25. The structure of claim 24 wherein: said thermal window section has a wall thickness in the range of 0.006 to 0.009 inch.

26. The structure of claim 24 wherein: said thermal window section has an inside annular surface tapering in a forward direction at an angle of between 12° and 20° relative to the longitudinal axis of the cover.

27. The structure of claim 24 wherein: said thermal window section has a length of about 0.10 inch and a wall thickness of 0.006 to 0.009 inch.

28. The structure of claim 24 wherein: said body of the cover is an elongated tube of flexible material.

29. The structure of claim 28 wherein: the end member has a tubular section, said body of the cover being positioned about said tubular section and secured thereto.

30. The structure of claim 24 wherein: the end member has a tubular section, said body of the cover including an elongated tube having an end positioned about said tubular section and secured thereto.

31. The structure of claim 24 wherein: said flexible wall of the thermal window section has a tapered non-convex inside surface which is complementary to the outside surface of the tip and of a size whereby the flexible wall stretches over the outside surface of the tip.

32. A temperature sensing probe and cover therefor comprising: a temperature sensing probe having an elongated member, a tip on one end of the elongated member, said tip having a wall, temperature responsive means secured to the tip, and holding means mounted on the other end of the elongated member; a cover having a tubular elastic side wall forming a cover chamber accommodating part of the elongated member, said side wall having an open end section surrounding the holding means, said open end section having means cooperating with the holding means to hold the cover in assembled relation with the elongated member and tip, said cover further having a closed end member of rigid material secured to the end of the side wall opposite the open end section; said end member having a flexible wall forming a thermal window section and a chamber accommodating the tip of the probe, said wall being located in surface engagement with the tip whereby heat from the environment adjacent the thermal window section is transferred through said thermal window section to the tip and temperature responsive means secured thereto.

33. The structure of claim 32 wherein: said tip including a wall having a tapered convex outside surface, and said flexible wall of the thermal window section has a tapered non-convex inside surface which is complementary to the outside surface and of a size whereby the flexible wall stretches over the outside surface of the tip.

34. The structure of claim 33 wherein: said outside surface and inside surface each has a general rounded cone shape.

35. The structure of claim 32 wherein: said thermal window section has a wall thickness substantially less than the thickness of the remainder of the wall of the end member.

36. The structure of claim 32 wherein: said thermal window section has a wall thickness in the range of 0.006 to 0.009 inch.

37. The structure of claim 32 wherein: said thermal window section has an inside annular surface tapering in a forward direction at an angle of between 12° and 20° relative to the longitudinal axis of the body.

38. The structure of claim 32 wherein: said closed end member has a front wall having a diameter of about half the diameter of the side wall of the cover.

39. The structure of claim 32 wherein: the closed end member has a tubular section, said side wall of the cover being positioned about said tubular section and secured thereto.

40. The structure of claim 32 wherein: the end member has a tubular section, said side wall of the cover having an end joined to the tubular section.

* * * * *

UNITED STATES PATENT AND TRADEMARK OFFICE
CERTIFICATE OF CORRECTION

PATENT NO. : 4,054,057
DATED : October 18, 1977
INVENTOR(S) : DOUGLAS J. KLUGE

It is certified that error appears in the above-identified patent and that said Letters Patent are hereby corrected as shown below:

Column 1, line 41, after "disposable" remove -- able --.

Column 1, line 42, "to" (first occurrence) should be -- of --.

Column 3, line 47, "other" should be -- outer --.

Column 4, line 8, after "cone-shaped", insert -- side --.

Claim 1, line 19, before "of" insert -- partially --.

Claim 4, line 1, "wherin" should be -- wherein --.

Claim 4, line 3, "thicknes" should be -- thickness --.

Claim 12, line 13, after "member" insert -- partially --.

Claim 24, line 11, after "member" (second occurrence) insert -- partially --.

Claim 32, line 13, after "member" insert -- partially --.

Signed and Sealed this

Seventh Day of February 1978

[SEAL]

Attest:

RUTH C. MASON
*Attesting Officer*

LUTRELLE F. PARKER
*Acting Commissioner of Patents and Trademarks*